United States Patent [19]

Fiala

[11] 3,799,576

[45] Mar. 26, 1974

[54] SAFETY DEVICE FOR VEHICLE OCCUPANTS

[75] Inventor: Ernst Fiala, Braunschweig-Querum, Germany

[73] Assignee: Volkswagenwerk Aktiengesellschaft, Wolfsburg, Germany

[22] Filed: Apr. 20, 1972

[21] Appl. No.: 245,941

[30] Foreign Application Priority Data

Apr. 24, 1971 Germany.............................. 2120173

[52] U.S. Cl....................... 280/150 AB, 280/150 B
[51] Int. Cl............................................. B60r 21/08
[58] Field of Search.................. 280/150 AB, 150 B

[56] References Cited
UNITED STATES PATENTS

| 3,715,130 | 2/1973 | Harada......................... | 280/150 AB |
| 3,624,810 | 11/1971 | Hass............................. | 280/150 AB |
| 3,425,712 | 2/1969 | Berryman..................... | 280/150 AB |
| 3,706,462 | 12/1972 | Lilly.............................. | 280/150 AB |
| 3,640,546 | 2/1972 | Brawn........................... | 280/150 AB |

FOREIGN PATENTS OR APPLICATIONS 609,624 9/1960 Italy............................... 280/150 AB Primary Examiner—David Schonberg
Assistant Examiner—John P. Silverstrim
Attorney, Agent, or Firm—Brumbaugh, Graves, Donohue & Raymond

[57] ABSTRACT

A safety device is disclosed for use in a vehicle for protecting an occupant from being thrown against the structure of the vehicle in the event of a collision. The device comprises an impact member which is movable, upon the occurrence of a collision, from a retracted rest position to an extended position at which it is adapted to absorb the impact of the occupant. Movement of the member is effected by a pressure source coupled to a piston-cylinder assembly associated with the member. A collision sensor actuates the pressure source. The impact member may be secured to a relatively gas-tight envelope, also pressurized, to afford enhanced protection. In a preferred form, the envelope includes a peripheral groove for engaging a coacting frame member to restrain the impact member at the extended position.

9 Claims, 3 Drawing Figures

PATENTED MAR 26 1974

SAFETY DEVICE FOR VEHICLE OCCUPANTS

BACKGROUND OF THE INVENTION

1. Field of the Invention

The present invention is a safety device which may be used in a vehicle. Upon its activation in the event of a collision, an impact member in the device is propelled outwardly towards an occupant in the vehicle to absorb the forward movement of his body due to collisional deceleration of the vehicle and thereby prevent him from striking the structure of the vehicle.

2. Description of the Prior Art

A number of safety devices for use in vehicles to protect vehicle occupants in the event of a collision are known. One such device is described in German Pat. No. 870,071 and is a resilient cushion positioned above the occupant's head at a distance between the windshield and the passenger which falls between the occupant and the windshield to protect him from striking the structure of the vehicle. This device is not actuated by a pressure means and does not strictly move towards the occupant when it is allowed to fall into position.

One of the best known apparatus which upon pressurized activation is propelled towards an occupant of a vehicle to prevent the occupant from striking the structure of the vehicle in the event of a collision is the well-known "air-bag" protection device. An example of a device of this type is described in German Pat. No. 896,312.

The typical air-bag apparatus comprises an inflatable, elastic container having little or no permeability to gas which at the instant of collision is explosively filled with a gaseous mixture by means of a suitable releasing arrangement. In its rest position the air-bag is placed in tightly folded condition in a suitable container in the vehicle in front of the occupant it is designed to protect. In order to perform its function the air-bag must be inflated within a few fractions of a second of the initial collisional impact, and inflation in such a short period of time generally causes a sound in the vehicle corresponding to the decible levels produced by detonation of a shotgun blast. Such sound levels commonly cause damage to the eardrums of the occupants in the vehicle. Another disadvantage in the use of the air-bag system is the enormous increase in volume and pressure inside the vehicle when the air-bag is activated. This also affects the eardrums of the occupants of the vehicle and commonly causes damage to certain parts of the vehicle body due to the increase in pressure. The doors of the vehicle are sometimes deformed by the increased pressure so that they can no longer be opened after the accident has occurred thereby causing an additional safety hazard.

It is therefore a purpose of the present invention to create a safety device which can hold an occupant inside a vehicle in the event of a collision of the vehicle but which has none of the above-mentioned disadvantages of the air-bag system.

SUMMARY OF THE INVENTION

The present invention is a device which protects an occupant of a motor vehicle, such as a car, bus, train or airplane, from being thrown against the structure of the vehicle in the event of a collision. It comprises an impact member which is movable between a retracted rest position and an extended position at which it is adapted to absorb the impact of an occupant, means which when pressurized act on the impact member when it is at its rest position urging it towards its extended position, means for pressuring the impact member moving means, and means responsive to the occurrence of a collision for actuating the pressurizing means to rapidly move the impact member to its extended position.

The impact member is initially restrained at the rest position, but is released upon pressurization of the moving means. Various arrangements can be employed for this purpose, including, for example, a frangible member anchoring the impact member to the vehicle body which ruptures when a particular pressure level is reached within the moving means.

As another feature of the invention, a relatively gastight envelope may be attached to the rear side of the impact member. It also is pressurized by the pressure source and serves to locate the impact member at the extended position. A coacting groove in the envelope and frame on the vehicle structure may be provided to restrain the member against movement from the extended position.

The impact member in the device is placed in its extended position with little or no increase in pressure or noise in the interior of the vehicle and thus overcomes the aforementioned disadvantages of the well known air-bag systems.

BRIEF DESCRIPTION OF THE DRAWINGS

The drawings, which also form a portion of this specification and which are appended herewith, show the applicant's invention in greater detail wherein.

DESCRIPTION OF A PREFERRED EMBODIMENT

Figure 1:
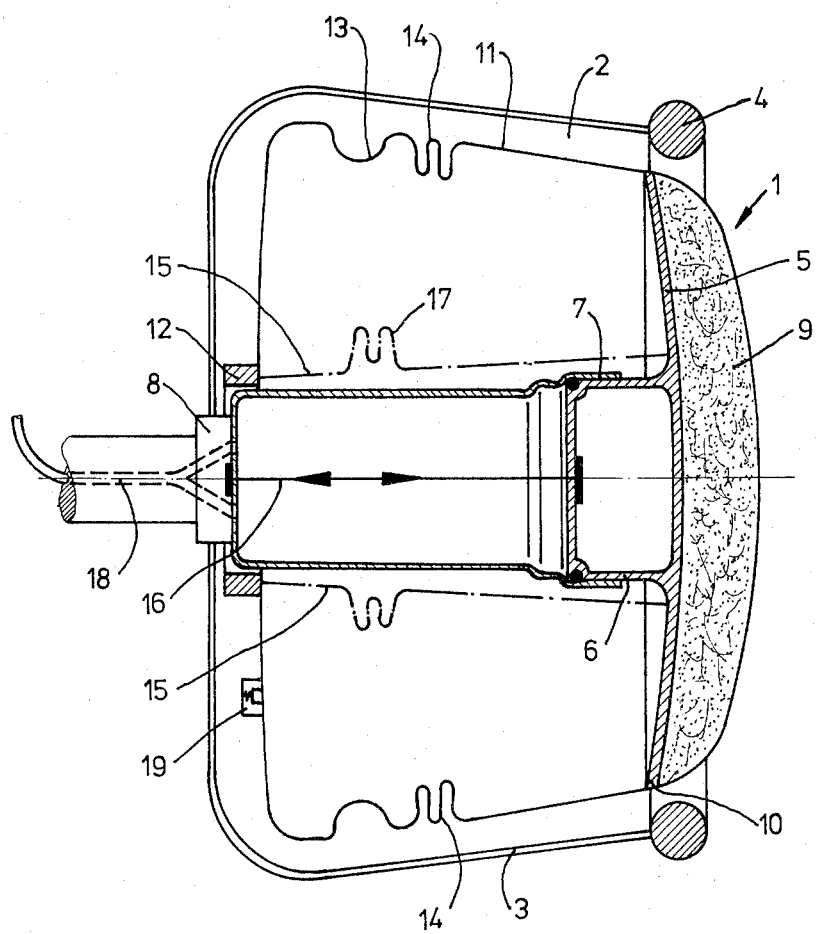
FIG. 1 is a view in section showing one embodiment of the apparatus of the present invention with the impact member being in its retracted rest position.

The present invention is, in its preferred embodiment, designed to be placed in a recessed space in a motor vehicle in front of the position normally occupied by an occupant in a vehicle. In one preferred embodiment it will be described in connection with placement within a recess in the steering wheel assembly of the vehicle. It should, however, be recognized that the device may also be placed in other positions in the vehicle directly in front of the space normally occupied by persons in the vehicle.

The apparatus 1 of the present invention as shown in the Figures is placed in a recess in the steering wheel assembly of the vehicle 23. The Figures show a steering column 8 having spokes 3 connecting with a steering rim 4 which is adapted to be held by the operator 34. The spokes 3 comprise a basket-shaped frame for the device of the present invention having a base which is directly connected with steering column 8 and upstanding sidewall members which are sloped inwardly and which have the steering wheel rim 4 at their uppermost end. The rounded steering wheel rim 4 serves as a stop means in accordance with the invention.

Situated adjacent the stop means 4 in the uppermost portion of the frame formed by the spokes 3 is the impact member which is an elastic plate 5 having cushioning 9 on the side which is designed to make contact with the occupant of the vehicle. The plate 5 has a portion formed in the shape of a piston member 6 which is on the opposite side of the plate from the cushioning 9. This piston is adapted to be seated in the open end of a cylinder 7 and the other end of cylinder 7 is joined to the vehicle, i.e., the steering column 8. The cylinder is capable of being pressurized, and the piston 6 is held in position against the pressure in the vessel after pressurization by restraining rope or cable 16.

Attached to the outermost periphery 10 of plate 5 and within recess 2 inside frame 3 is one end of a cover or envelope 11 whose presence helps prevent a large increase of pressure or noise in the vehicle when the device is activated. A safety valve 19 is provided to help vent off any excess pressure developed within cover 11. The cover 11 is also of a generally basket-shaped configuration, having its other end connected to a ring 12 which is slidably mounted on the cylinder 7 adjacent the end of the cylinder which is joined to the steering column 8. Coupling ropes 15, having loops 17 that can give additional extension to the device as described below, directly join ring 12 to elastic plate 5. The cover 11 has a peripheral groove 13, forming recessed stop means, adjacent the merging point of the sidewall members and base of frame 3 which is adapted to mate or engage with stop means 4. The cover 11 has folds 14 to allow full extension of the device when it is activated.

Figure 2:
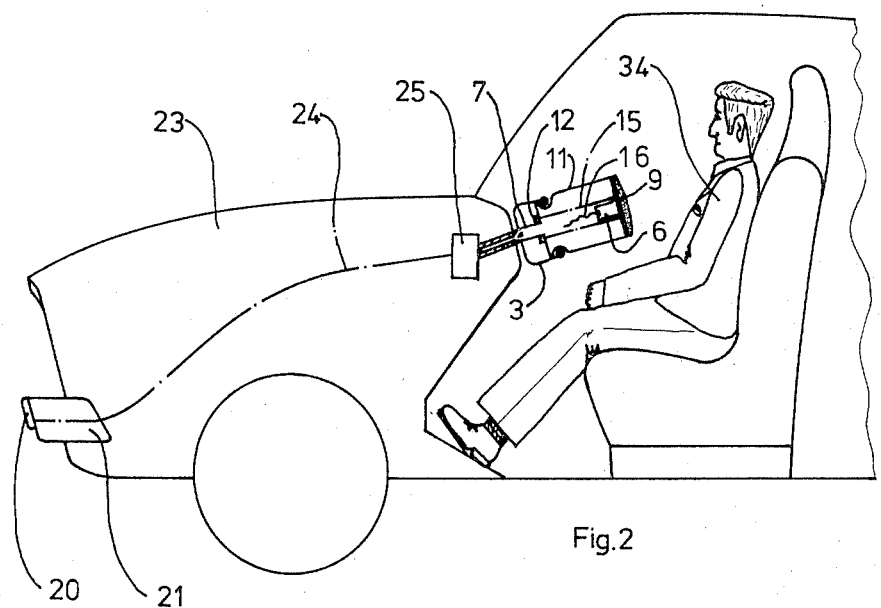
FIG. 2 is a sectional view of the front end of a vehicle and shows the apparatus of the present invention in its fully extended position.

Upon collision, a sensor 20, such as that described in my copending application entitled "Collision Sensor", U.S. Ser. No. 241,788, located in bumper 21 of the vehicle 23 and connected by cable 24 to a conventional gas generation device 25, e.g. a pyrotechnical element, triggers the device 25 to supply gas at high pressure to channel 18, inlets 26 and cylinder 7. The rope or cable 16 depicted in the embodiment of the invention shown in FIG. 1 has a breaking strength which is lower than the force exerted on it by the pressure increase in cylinder 7 acting on piston 6 upon activation of gas generation means 25. Therefore, the cable will break when a desired preselected pressure level is reached to remove the restraint on the outward movement of piston 6. The severing of the rope or cable 16 occurs within a few fractions of a second of the collision and before the full impact of the collision reaches the portion of the vehicle 23 occupied by the occupant 34. The outward movement of piston 6 and the attached, cushioned, elastic pad 5 also moves slidably mounted ring 12, coupling cables 15 and elastic cover 11 as a unit outwardly towards the occupant. The outward movement of the plate 5 and cushioning 9 thereon continues until recessed stop means 13 in the cover 11 reach rounded stop means 4 in the sidewalls of frame 3 and the two respective stop means are in engaging relationship. Folds 14 in cover 11 and loops 17 in rope or cable 15 provide for additional extension of the cushioned elastic plate 5 to its fully extended position as depicted in FIG. 2 after stop means 13 mates with stop means 4 so that the device is in position to absorb and cushion the forward movement of the occupant.

Figure 3:
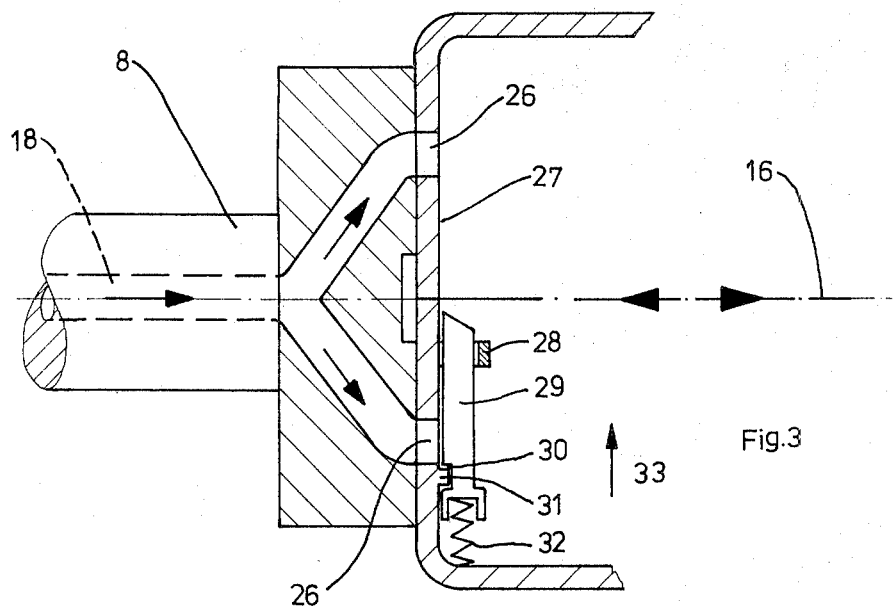
FIG. 3 shows a partial sectional view of another embodiment of the invention wherein a spring-mounted knife is used to release the impact member.

FIG. 3 shows another embodiment of the invention in which a cutting device is situated in cylinder 7 adjacent pressure inlet 26. Compressed gas enters through conduit 18 and inlets 26 as described above. The pressure increase through one inlet 26 acts directly on the surface of cutting knife 29 which is mounted on compressed spring 32 for sliding movement towards cable 16 through shackle 28. A recess 30 in the cutting knife 29 is normally engaged by nub 31 on the cylinder wall 27 but it is forced off the nub when the gas pressure in line 18 rises to a desired high value upon activation of gas generation means 25. The spring 32 then forces the knife into the rope or cable 16 to sever it and allow the impact member to travel outwardly towards the occupant.

A person familiar with the art to which this invention pertains upon reading the foregoing will become aware of modifications which may be made in the invention described herein without departing from the spirit and scope of the invention. The foregoing is therefore intended to be merely illustrative of preferred embodiments of the invention. The appended claims define the scope of the invention.

I claim:

1. An impact-absorbing safety device for protecting an occupant of a vehicle from being thrown against the structure of the vehicle in the event of a collision comprising:

an impact member movable towards the occupant between a retracted, rest position and an extended position at which it is adapted to absorb the impact of the occupant;

means adapted to be pressurized for moving the impact member to the extended position and comprising cylinder means mounted on the vehicle structure and piston means carried by the impact member and slidably received within the cylinder means;

envelope means on the one side secured to an annular member positioned around the cylinder means and slidable therealong upon movement of the impact member to the extended position and on the other side secured to the impact member and defining therewith a relatively gas-tight enclosure on the side thereof away from the occupant;

means for pressurizing the cylinder means and moving the piston means out of the cylinder means towards the occupant, thereby also pressurizing the envelope means to provide a further impact absorbing capability; and means responsive to the occurrence of a collision for actuating the pressurizing means, thereby causing the impact member to be moved rapidly to the extended position.

2. A device as claimed in claim 1 further comprising:

releasable means for initially restraining the impact member in the rest position; and means responsive to the supply of pressure to the impact member moving means for releasing the restraining means.

3. A device as claimed in claim 2 wherein:

the restraining means comprises a frangible member coupling the impact member to the vehicle structure; and the releasing means comprises spring-biased knife means for severing the frangible member.

4. A device as claimed in claim 1 wherein the impact member comprises a plate having cushioning on the side facing the occupant.

5. A device as claimed in claim 1 wherein the pressurizing means comprises a gas generating source.

6. A device as claimed in claim 1 further comprising means for coupling the annular member to the impact member upon movement of the impact member to the extended position.

7. A device as claimed in claim 1 further comprising means for restraining the impact member at the extended position, said means including:
- an overhanging frame member positioned in surrounding relation to the envelope means and rigidly secured to the vehicle structure; and
- means defining a peripheral groove in the envelope means, said groove being adapted to engage the overhanging frame member when the impact member is at the extended position.

8. A device as claimed in claim 1 further comprising means for restraining the impact member at the extended position, said means including:
- a. an overhanging frame member positioned in surrounding relation to the envelope means and rigidly secured to the vehicle structure; and
- b. means defining a peripheral groove in the envelope means, said groove being adapted to engage the overhanging frame member when the impact member is at the extended position.

9. An impact-absorbing safety device for protecting an occupant of a vehicle from being thrown against the structure of the vehicle in the event of a collision comprising:
- an impact member movable towards the occupant between a retracted, rest position and an extended position at which it is adapted to absorb the impact of the occupant;
- means adapted to be pressurized for moving the impact member to the extended position;
- means for pressurizing the impact member moving means;
- means responsive to the occurrence of a collision for actuating the pressurizing means, thereby causing the impact member to be moved rapidly to the extended position;
- a frangible member coupling the impact member to the vehicle strucure and initially restraining the impact member in the rest position; and
- a spinrg-biased knife responsive to the supply of pressure to the impact member for severing the frangible member.

* * * * *